United States Patent
Krishnan et al.

(10) Patent No.: US 12,529,762 B2
(45) Date of Patent: Jan. 20, 2026

(54) ROTATABLY SUPPORTED SENSOR HOUSING

(71) Applicant: Ford Global Technologies, LLC, Dearborn, MI (US)

(72) Inventors: Venkatesh Krishnan, Canton, MI (US); Rashaun Phinisee, Ypsilanti, MI (US); Raghuraman Surineedi, Dearborn, MI (US); Michael Robertson, Jr., Garden City, MI (US); Tyler D. Hamilton, Farmington, MI (US); Segundo Baldovino, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1286 days.

(21) Appl. No.: 17/308,118

(22) Filed: May 5, 2021

(65) Prior Publication Data

US 2022/0357426 A1    Nov. 10, 2022

(51) Int. Cl.
*G01S 7/481*    (2006.01)
*G01S 17/931*    (2020.01)

(52) U.S. Cl.
CPC .......... *G01S 7/4813* (2013.01); *G01S 7/4817* (2013.01); *G01S 17/931* (2020.01)

(58) Field of Classification Search
CPC .... G01S 7/4813; G01S 7/4817; G01S 17/931; B60R 11/00; B60R 2011/0094
See application file for complete search history.

(56) References Cited

U.S. PATENT DOCUMENTS

| | | | |
|---|---|---|---|
| 6,283,728 B1* | 9/2001 | Tomoiu | F01C 11/008 418/249 |
| 10,843,668 B2 | 11/2020 | Bretagnol et al. | |
| 2014/0199933 A1* | 7/2014 | Wissmueller | B60H 1/249 454/162 |
| 2016/0160755 A1* | 6/2016 | Kruijer | F02C 7/105 60/39.45 |
| 2020/0101945 A1 | 4/2020 | Trebouet et al. | |
| 2020/0191614 A1* | 6/2020 | Ellgas | G01D 11/245 |
| 2021/0268869 A1* | 9/2021 | Chen | H05K 7/20972 |

FOREIGN PATENT DOCUMENTS

DE    102018210057 A1    12/2019
WO    WO-2020062115 A1 *    4/2020

* cited by examiner

*Primary Examiner* — Isam A Alsomiri
*Assistant Examiner* — Sanjida Naser
(74) *Attorney, Agent, or Firm* — Frank A. MacKenzie; Brooks Kushman P.C.

(57) ABSTRACT

An assembly includes a base. The assembly housing includes a sensor housing rotatably supported by the base and having a sensor window. The sensor housing defines a passage that extends through the sensor housing from an inlet vent at a leading end of the passage to an outlet vent at the trailing end of the passage. The outlet vent faces the sensor window.

20 Claims, 5 Drawing Sheets

ROTATABLY SUPPORTED SENSOR HOUSING

BACKGROUND

A vehicle can include a system or systems for autonomously or semi-autonomously operating the vehicle, e.g., an advanced driver assist system (ADAS) for speed control, lane-keeping, etc.

The system or systems for autonomously or semi-autonomously operating the vehicle may include a variety of devices such as are known to provide data to a vehicle computer. For example, the system(s) may include Light Detection And Ranging (LIDAR) vehicle sensor(s), etc., disposed on a top of the vehicle, behind a vehicle front windshield, around the vehicle, etc., that provide relative locations, sizes, and shapes of objects surrounding the vehicle. As another example, one or more radar vehicle sensors fixed to vehicle bumpers may provide data to provide locations of the objects, second vehicles, etc., relative to the location of the vehicle. The system(s) may further alternatively or additionally, for example, include camera vehicle sensor(s), e.g. front view, side view, etc., providing images from an area surrounding the vehicle.

DETAILED DESCRIPTION

Figure 1:
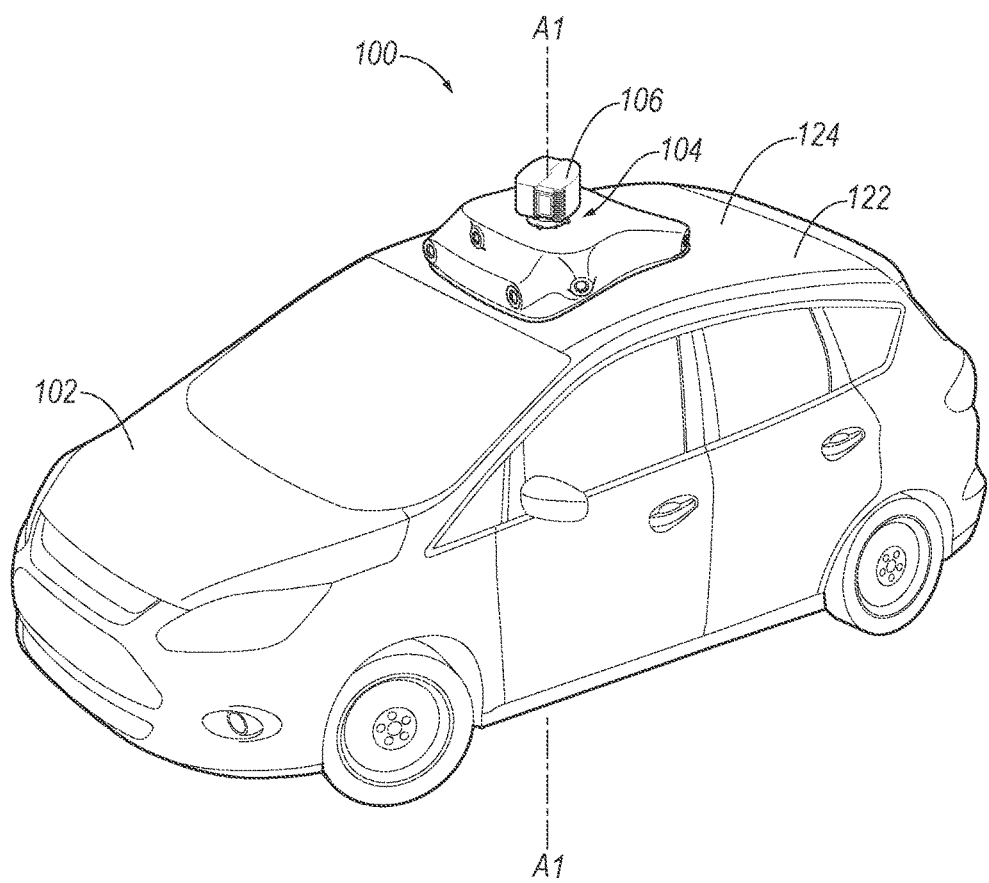
FIG. 1 is a perspective view of a vehicle with a sensor assembly.

An assembly includes a base. The assembly housing includes a sensor housing rotatably supported by the base and having a sensor window. The sensor housing defines a passage that extends through the sensor housing from an inlet vent at a leading end of the passage to an outlet vent at trailing end of the passage. The outlet vent faces the sensor window.

The assembly may include a sensor supported be the base within the sensor housing and facing out the sensor window.

The assembly may include a motor operatively coupled the sensor housing such that torque from the motor rotates the sensor housing.

Rotation of the sensor housing by the motor may define a rotation direction, and the inlet vent may be forward of the outlet vent relative to the rotation direction.

The assembly may include a cover supported by the sensor housing at the inlet vent.

The cover may include a plurality of openings in fluid communication with the passage.

The cover may be movable between a closed position covering the inlet vent and an open position not covering the inlet vent.

The assembly may include a spring urging the cover toward the closed position.

The open position of the cover may be radially outward of the closed position.

The sensor housing may include a baffle in the passage.

The sensor housing may include a second baffle spaced from the baffle along the passage.

The second baffle may be above the baffle.

The second baffle may be between the baffle and the outlet vent along the passage.

The passage may be above the baffle and below the second baffle.

The sensor housing may include a drain hole between the inlet vent and the baffle.

The sensor housing may include a second drain hole between the outlet vent and the baffle.

The assembly may include a heatsink in the passage.

The heatsink may be thermally coupled to a motor or a sensor.

A cross-sectional area of the inlet vent may be larger than a cross-sectional area of the outlet vent.

With reference to the FIGS. 1-5, an assembly 100 for collecting data, e.g., for autonomous operation of a vehicle 102, includes a base 104 and a sensor housing 106 rotatably supported by the base 104. The sensor housing 106 has a sensor window 108. The sensor housing 106 defines a passage 110 that extends from an inlet vent 112 at a leading end 114 of the passage 110 to an outlet vent 116 at trailing end 118 of the passage 110. The outlet vent 116 faces the sensor window 108.

Rotation of the sensor housing 106 relative to the base 104 can urge air into the inlet vent 112, e.g., via ram air effect. The air may flow along a path AP, shown in FIGS. 3 and 4, though the passage 110 to the outlet vent 116 and across the sensor window 108. Air flow across the sensor window 108 may help maintain a clear field of view FOV of a sensor 120 positioned to collected data via the sensor window 108.

With reference to FIG. 1, the vehicle 102 may be any suitable type of ground vehicle, e.g., a passenger or commercial automobile such as a sedan, a coupe, a truck, a sport utility, a crossover, a van, a minivan, a taxi, a bus, etc.

The vehicle 102 may be an autonomous vehicle. A vehicle computer can be programmed to operate the vehicle 102 independently of the intervention of a human driver, completely or to a lesser degree. The computer may be programmed to operate the propulsion, brake system, steering, and/or other vehicle 102 systems based at least in part on data received from the sensor 120. For the purposes of this disclosure, autonomous operation means the computer controls the propulsion device, brake system, and steering system without input from a human driver; semi-autonomous operation means the computer controls one or two of the propulsion system, brake system, and steering system and a human driver controls the remainder; and nonautonomous operation means a human driver controls the propulsion system, brake system, and steering system.

The vehicle 102 may include a vehicle body 122. The vehicle body 122 includes body panels partially defining an exterior of the vehicle 102. The body panels may present a class-a surface, e.g., a finished surface exposed to view by a customer and free of unaesthetic blemishes and defects. The body panels include, e.g., a roof 124, etc.

The sensor 120 detects objects. The sensor 120 more specifically may be an object detection sensor. Examples of object detection sensors include lidar, radar, image sensors including cameras, etc. The sensor 120 may include a variety of devices such as are known to provide data to the vehicle computer. For example, the sensor 120 may include Light Detection And Ranging (LIDAR) vehicle sensor(s), etc., that provide relative locations, sizes, and shapes of objects surrounding the vehicle 102. The sensor 120 may further alternatively or additionally, for example, include cameras providing images from an area surrounding the vehicle 102. In the context of this disclosure, an object is a physical, i.e., material, item that can be represented by physical phenomena (e.g., light or other electromagnetic waves, or sound, etc.) detectable by the sensor 120. Thus, vehicles, as well as other items including as discussed below, fall within the definition of "object" herein.

The sensor 120 and one or more additional sensors 120 may be supported by and/or disposed in the base 104. The base 104 may be attachable to the vehicle 102, e.g., to one of the body panels of the vehicle 102, e.g., the roof 124. The base 104 may enclose and protect operational components of the sensors 120. The base 104 may be shaped to be attachable to the roof 124, e.g., may have a shape matching a contour of the roof 124. The base 104 may be attached to the roof 124, which can provide the sensors 120 with an unobstructed field of view FOV of an area around the vehicle 102. The base 104 may be a component of the vehicle 102, e.g., the roof 124. The base 104 may be formed of, for example, plastic or metal.

The base 104 rotatably supports the sensor housing 106, i.e., such that the sensor housing 106 can rotate relative to the base 104. For example, the sensor housing 106 may rotate about a vehicle vertical axis A1. The base 104 may be fixed to the vehicle 102 such that rotation about the vehicle vertical axis A1 is inhibited. The sensor housing 106 may be supported by the base 104, for example, via a bearing or other suitable structure that permits relative rotation between components. The base 104 may rotatably support the sensor 120, e.g., via a bearing or other suitable structure.

Figure 3:
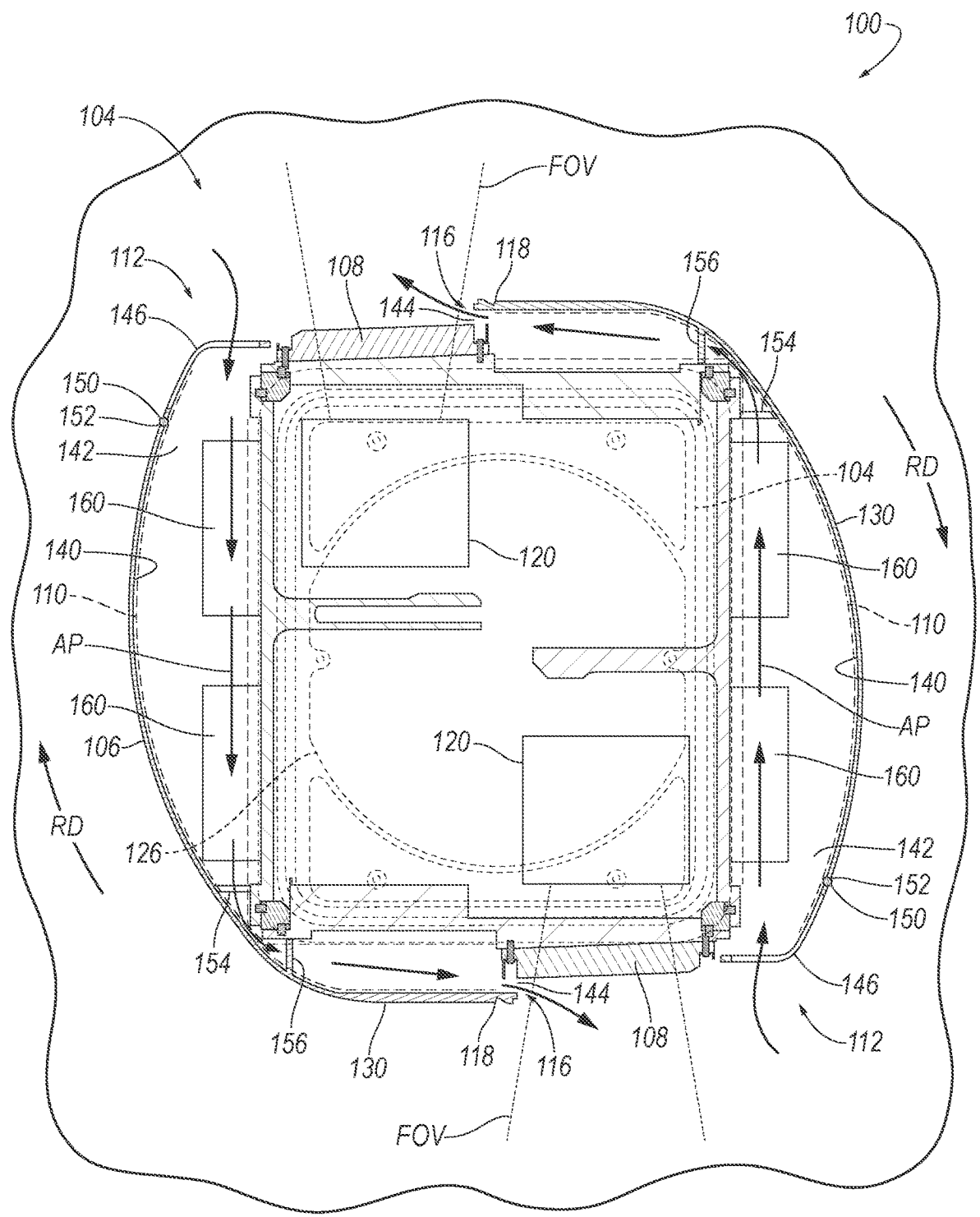
FIG. 3 is a top cross-section view of the sensor assembly.
Figure 4:
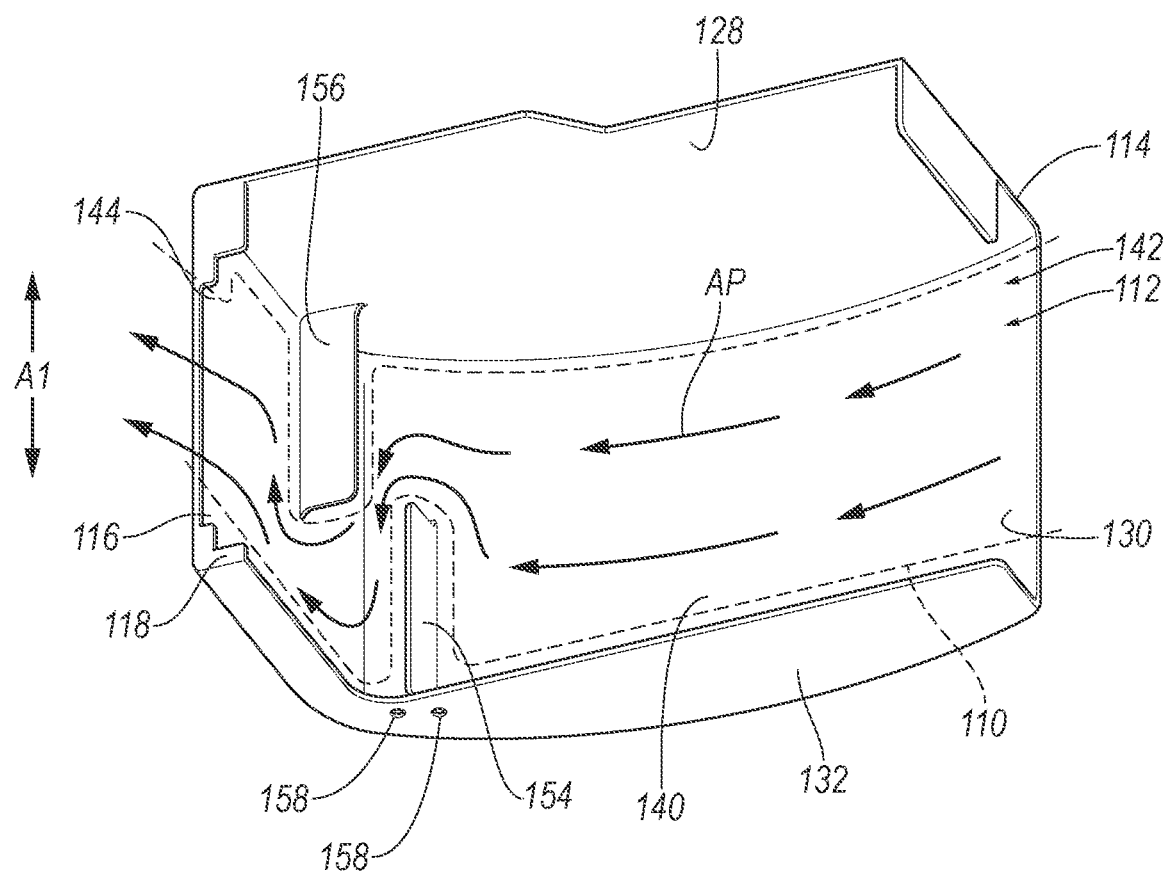
FIG. 4 is a perspective view of a component of the sensor assembly.

A motor 126, shown in FIG. 3, may be operatively coupled to the sensor housing 106, i.e., such that torque generated by the motor 126 rotates the sensor housing 106. For example, a drive shaft off the motor 126 may be connected to the sensor housing 106 via belts, shafts, gears, chains, etc. The motor 126 may be, for example, an electric motor that includes magnets, induction coils, etc. As another example, the motor 126 may be a pneumatic motor having vanes or the like. Pressurized air, e.g., from within the base 104, from a supply line, etc., may provide rotation of the vanes. The motor 126 may be operatively coupled to the sensor 120, i.e., to rotate the sensor 120 relative to the base 104. Rotation of the sensor housing 106 by the motor 126 defines a rotation direction RD. The rotation direction RD is a direction of rotation of the sensor housing 106 when the motor 126 is actuated, e.g., when a specified voltage (including a polarity), fluid pressure, etc., is provided to the motor 126.

With reference to FIGS. 2-5, the sensor housing 106 may include a top wall 128 and side walls 130 extending downward from the top wall 128. The side walls 130 may extend about a perimeter of the top wall 128. A lip 132 may extend along a bottom edge of the side walls 130 distal from the top wall 128. The lip 132 may extend inward, e.g., toward a center of the sensor housing 106. The sensor housing 106 may include a first portion 134 and a second portion 136. The first portion 134 and the second portion 136 may snap, or otherwise fix to each other. The first portion 134 and the second portion 136 may be identical. The first portion 134 may be separated from the second portion 136 with a seam 138. The seam 138 may extend vertically along the side walls 130 and horizontally across the top wall 128. The sensor housing 106 may be unitary (not shown). Unitary means a single, uniform piece of material with no seams, joints, fasteners, or adhesives holding it together, i.e., formed together simultaneously as a single continuous unit, e.g., by machining from a unitary blank, molding, forging, casting, etc. Non-unitary components, in contrast, are formed separately and subsequently assembled, e.g., by threaded engagement, welding, etc.

The sensor housing 106 covers and protects the sensor 120. The sensor 120 may be supported be the base 104 within the sensor housing 106. For example, the top wall 128 of the sensor housing 106 may extend over top of the sensor 120. The side walls 130 may surround the sensor 120, e.g., about the vertical axis A1 and around a front, a back, and sides of the sensor 120. In other words, the sensor 120 may enclose a top and sides of a chamber, and the sensor 120 may be in the chamber. An inside surface 140 of side walls 130 may face the sensor 120.

The sensor window 108 is transparent with respect to a medium that the sensor 120 is capable of detecting, e.g., visible light. For example, the sensor window 108 can be, e.g., safety glass, i.e., two layers of glass attached to a vinyl layer; polycarbonate, etc. The sensor 120 faces out the sensor window 108, i.e., such that light or other medium detectable by the sensor 120 travels through the sensor window 108 to the sensor 120. In other words, a field of view FOV of sensor 120 may extend through the sensor window 108.

The sensor housing 106 defines the passage 110. For example, the passage 110 may be between the inside surface 140 of side walls 130 and the sensor 120. The passage 110 may be between the top wall 128 and the lip 132 at the bottom of the side walls 130. The passage 110 extends through the sensor housing 106 from the inlet vent 112 to the outlet vent 116.

The inlet vent 112 is at the leading end 114 of the passage 110. The leading end 114 of the passage 110 is forward of the trailing end 118 relative to the rotation direction RD. The inlet vent 112 may face the rotation direction RD, i.e., such that air is urged into the inlet vent 112 while the sensor housing 106 is rotating in the rotation direction RD. The inlet vent 112 may include a first opening 142 in fluid communication with ambient air. Ram air effect caused by rotating the sensor housing 106 may force ambient air through the first opening 142 of the inlet vent 112 into the passage 110.

The outlet vent 116 is at the trailing end 118 of the passage 110. The outlet vent 116 faces the sensor window 108, i.e., such that air flow from the passage 110 and out of the outlet vent 116 flows into and/or across the sensor window 108. Air flow into and/or across the sensor window 108 may aid in maintaining clarity of the field of view FOV of the sensor 120 that detects objects via the sensor window 108. The outlet vent 116 may include, for example, a second opening 144 adjacent the sensor window 108. The second opening 144 may be elongated along the vertical axis A1. The second opening 144 may provide fluid communication between the outlet vent 116 and ambient air outside the sensor housing 106. Air may flow out of the passage 110 via the outlet vent 116.

The inlet vent 112 is forward of the outlet vent 116 relative to the rotation direction RD, e.g., defined by the motor 126. In other words, the inlet vent 112 may be at a specified rotational position before the outlet vent 116 is at such position while the sensor housing 106 is rotated in the rotation direction RD. Having the inlet vent 112 forward of the outlet vent 116 relative to the rotation direction RD urges air into the inlet vent 112 and through the passage 110 to the outlet vent 116 when the sensor housing 106 is rotated in the rotation direction RD, e.g., via ram air effect.

The inlet vent 112 defines a first cross-sectional area. The first cross-sectional area is an area defined by the inlet vent 112 and though which air flows into the passage 110. The first cross-sectional area may extend perpendicular to the air flow into the first vent.

The outlet vent 116 defines a second cross sectional area. The second cross-sectional area is an area defined by the outlet vent 116 and through which air may flow out of the passage 110. The second cross-sectional area may extend perpendicular to the air flow out of the outlet vent 116.

The first cross-sectional area of the inlet vent 112 may be larger than second cross-sectional area of the outlet vent 116. The larger first cross-sectional area of the inlet vent 112 provides increased air flow velocity to air flow out of the outlet vent 116. In other words, the smaller second cross-sectional area of the outlet vent 116 may provide a nozzle effect to air entering the inlet vent 112.

The assembly 100 may include a cover 146 supported by the sensor housing 106 at the inlet vent 112. The cover 146 may reduce an amount of debris, such as leaves and the like, entering the inlet vent 112. The cover 146 can include a plurality of third openings 148 in fluid communication with the passage 110. The third openings 148 may face the rotation direction RD. Ambient air may flow into the passage 110 via the third openings 148, e.g., when the sensor housing 106 is rotated in the rotation direction RD.

Figure 2:
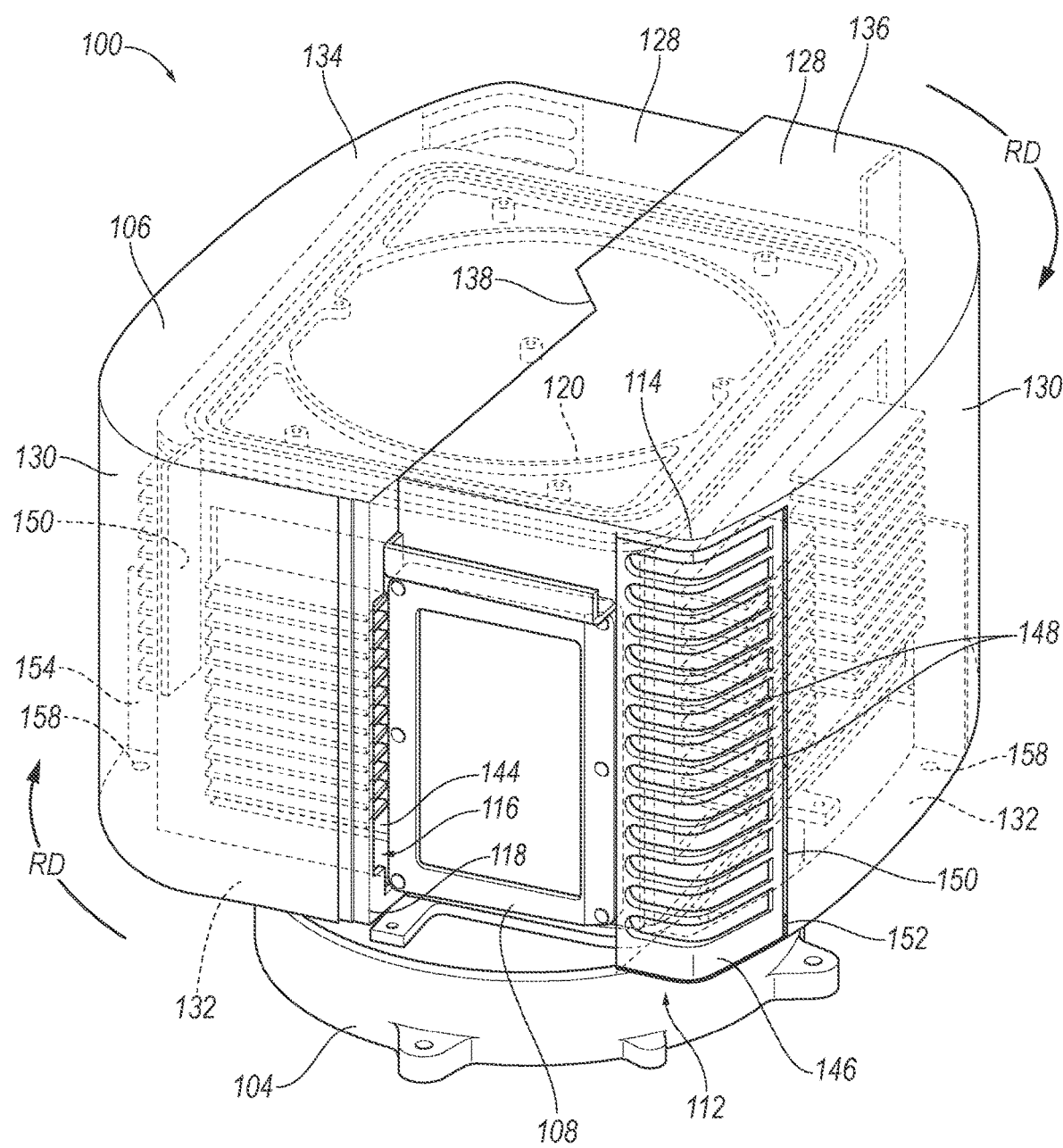
FIG. 2 is a perspective view of the sensor assembly.
Figure 5:
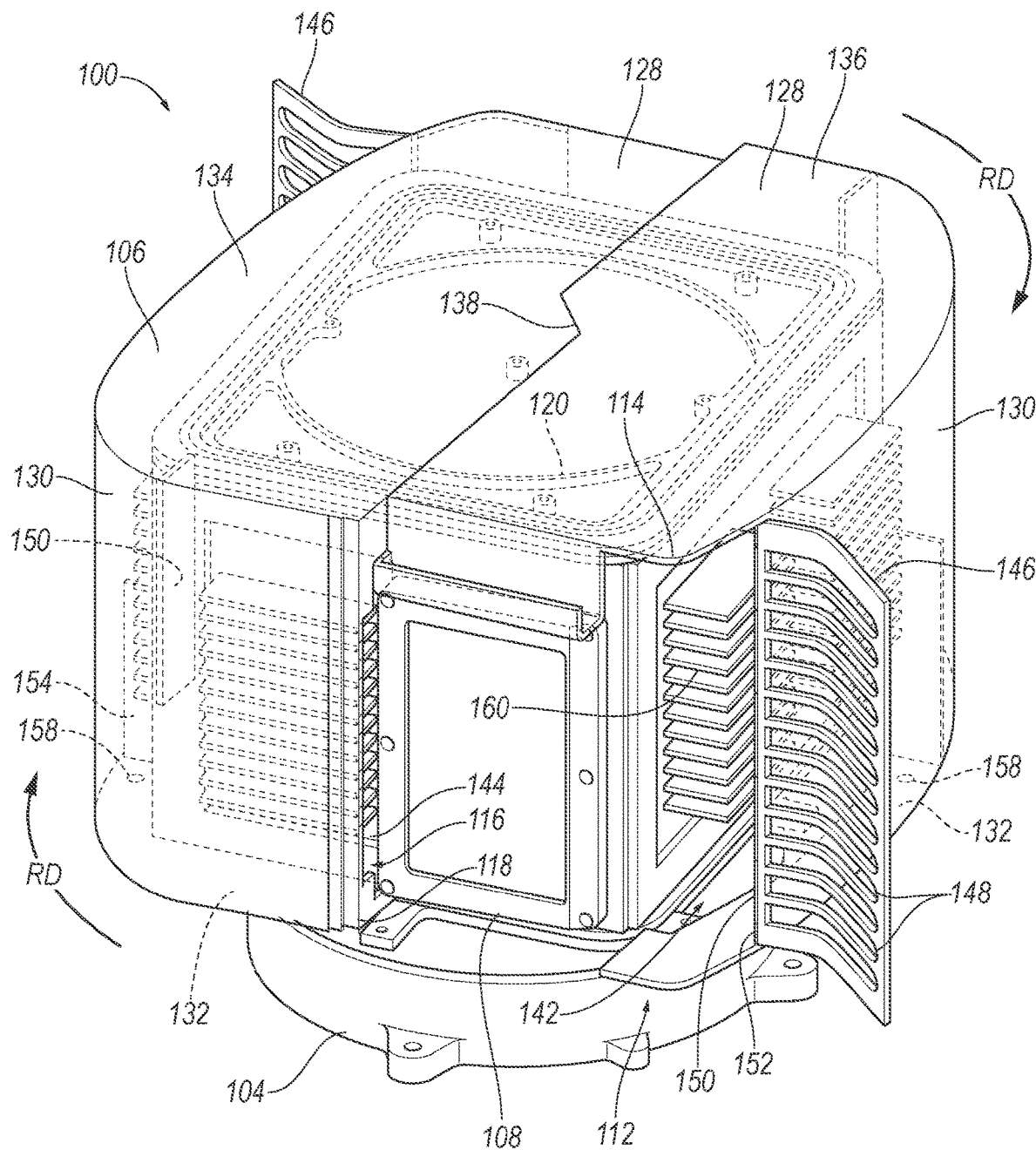
FIG. 5 is a perspective view of the sensor assembly with a cover in an open position.

The cover 146 may be movable between a closed position, shown in FIGS. 2 and 3, and an open position, shown in FIG. 5. The cover 146 in the closed position covers the inlet vent 112 and limits airflow into the passage 110. For example, the cover 146 in the closed position may vertically extend above and below the first opening 142 along the vertical axis A1 and beyond sides of the first opening 142 perpendicular to the vertical axis A1. The cover 146 in the closed position may abut the inlet vent 112 surrounding the first opening 142. Air flow may enter the passage 110 through the third openings 148 when the cover 146 is in the closed position. The cover 146 in the open position does not cover 146 the inlet vent 112. For example, the cover 146 in the open position may be spaced from the inlet vent 112 at the first opening 142. The cover 146 in the open position may permit air flow directly into the first opening 142. The first cross-sectional area of the inlet vent 112 with the cover 146 in the open position is greater than a cross-sectional area of the inlet vent 112 with the cover 146 in the closed position.

The open position of the cover 146 is radially outward of the closed position relative to the rotation direction RD. For example, the cover 146 may be supported by the sensor housing 106 via a hinge 150. The hinge 150 may extend along the vertical axis A1. The cover 146 may pivot about the hinge 150 between the closed position and the open position. Centrifugal force generated from rotation of the sensor housing 106 urges the cover 146 toward the open position.

The assembly 100 may include a spring 152 that urges the cover 146 toward the closed position, e.g., with a specified amount of force. The spring 152 maintains the cover 146 in the closed position when the sensor housing 106 is rotated below a certain speed and centrifugal force from such rotation is insufficient to overcome force from the spring 152. The cover 146 moves to the open position when the sensor housing 106 is rotated above the certain speed and centrifugal force from such rotation overcomes the force from the spring 152. The spring 152 may be, for example, a torsion spring supported at the hinge 150 and biasing the cover 146 relative to the sensor housing 106.

The sensor housing 106 can include one or more baffles 154, 156, e.g., a first baffle 154 and a second baffle 156, in the passage 110. The baffles 154, 156 may separate water from air flowing through the passage 110. The baffles 154, 156 may extend inward from the inside surface 140 of the side walls 130. The second baffle 156 is above the first baffle 154. For example, the first baffle 154 may extend upward from the lip 132 with the passage 110 extending above the first baffle 154 and the second baffle 156 may extend downward from the top wall 128 with the passage 110 extending below the second baffle 156. The first baffle 154 may be spaced from the second baffle 156 spaced along the passage 110, e.g., with the second baffle 156 between the first baffle 154 and the outlet vent 116 along the passage 110. Air and water mixture may enter the inlet vent 112 impact the baffles 154, 156 as the mixture flows through the passage 110 into, above, and below the baffles 154, 156. Water may separate from such mixture onto the baffles 154, 156.

The sensor housing 106 can include a drain hole 158, e.g., extending thorough the lip 132. The drain holes 158 may be before and after the first baffle 154 along the passage 110. For example, one drain hole 158 may be between the inlet vent 112 and the first baffle 154, and another drain hole 158 may be between the outlet vent 116 and the first baffle 154. Water, e.g., separated from air in the passage 110 by the baffles 154, 156, may flow out of the passage 110 via the drain holes 158.

The assembly 100 can include one or more heatsinks 160 in the passage 110. The heatsinks 160 control temperatures of components of the assembly 100, e.g., temperatures of the sensor 120, the motor 126, etc. For example, the heatsink 160 may dissipate heat generated by operation of one or more components of the assembly 100. The heatsink 160 may be a material having a high thermal conductivity, e.g., aluminum or copper. The heatsink 160 may be thermally coupled to the sensor 120 and/or the motor 126, e.g., via heat pipes or other thermal conductor. A thermal conductor, for the purposes of this disclosure, is defined as a component with a high thermal conductivity, substantially at least as high as the thermal conductivity of the heatsink 160.

Each heatsink 160 may include a plurality of fins. The fins are oriented and elongated horizontally, i.e., perpendicular to the vertical axis A1 and along the passage 110. Each fin may have, e.g., a rectangular shape. Each adjacent pair of fins are spaced along the vertical axis A1 and defines a gap therebetween. The gaps permit airflow between the fins and to provide enhanced heat dissipation, e.g., as comparted to without such fins.

Air flowing through the passage 110, e.g., from rotation of the sensor housing 106, may flow across heatsink 160, e.g., through the gaps between the fins, and absorb heat energy. The air absorbing heat energy from the heatsink 160 reduces a temperature of a component thermally coupled to the heatsink 160, such as the sensor 120 or the motor 126.

The adjectives "first," "second," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

The invention claimed is:

1. An assembly, comprising:
   a base;
   a sensor housing rotatably supported by the base and having a sensor window;

the sensor housing defines a passage that extends through the sensor housing from an inlet vent at a leading end of the passage to an outlet vent at the trailing end of the passage; and the outlet vent faces the sensor window; and a motor operatively coupled to the sensor housing to rotate the sensor housing in a rotation direction about an axis of rotation, the inlet vent and the outlet vent being radially spaced from the axis of rotation and being circumferentially spaced from each other along the sensor housing about the axis of rotation.

2. The assembly of claim 1, further comprising a sensor supported by the base within the sensor housing and facing out the sensor window.

3. The assembly of claim 1, wherein the inlet vent is forward of the outlet vent relative to the rotation direction.

4. The assembly of claim 1, further comprising a cover supported by the sensor housing at the inlet vent.

5. The assembly of claim 4, wherein the cover includes a plurality of openings in fluid communication with the passage.

6. The assembly of claim 4, wherein the cover is movable between a closed position covering the inlet vent and an open position not covering the inlet vent.

7. The assembly of claim 6, further comprising a spring urging the cover toward the closed position.

8. The assembly of claim 6, wherein the open position of the cover is radially outward of the closed position.

9. The assembly of claim 1, wherein the sensor housing includes a baffle in the passage.

10. The assembly of claim 9, wherein the sensor housing includes a second baffle spaced from the baffle along the passage.

11. The assembly of claim 10, wherein the second baffle is above the baffle.

12. The assembly of claim 11, wherein the second baffle is between the baffle and the outlet vent along the passage.

13. The assembly of claim 9, wherein the sensor housing includes a drain hole between the inlet vent and the baffle.

14. The assembly of claim 13, wherein the sensor housing includes a second drain hole between the outlet vent and the baffle.

15. The assembly of claim 1, further comprising a heatsink in the passage.

16. The assembly of claim 15, wherein the heatsink is thermally coupled to the motor or a sensor.

17. The assembly of claim 1, wherein a cross-sectional area of the inlet vent is larger than a cross-sectional area of the outlet vent.

18. The assembly of claim 1, wherein the housing includes an outer wall extending in the direction of rotation from the outlet to the inlet, the passage extending along the outer wall from the inlet to the outlet.

19. The assembly of claim 1, wherein the inlet is open in the rotation direction and the outlet is open in a direction opposite the rotation direction.

20. The assembly of claim 1, wherein the inlet and the outlet are both elongated along the axis of rotation.

\* \* \* \* \*